No. 835,911. PATENTED NOV. 13, 1906.
P. F. MILLER.
STANCHION.
APPLICATION FILED APR. 4, 1905.

2 SHEETS—SHEET 1.

Witnesses
E. K. Reichenbach.
E. M. Dolford

Inventor
P. F. Miller.

By Chandler & Chandler
Attorneys

THE NORRIS PETERS CO., WASHINGTON, D. C.

No. 835,911. PATENTED NOV. 13, 1906.
P. F. MILLER.
STANCHION.
APPLICATION FILED APR. 4, 1905.
2 SHEETS—SHEET 2.
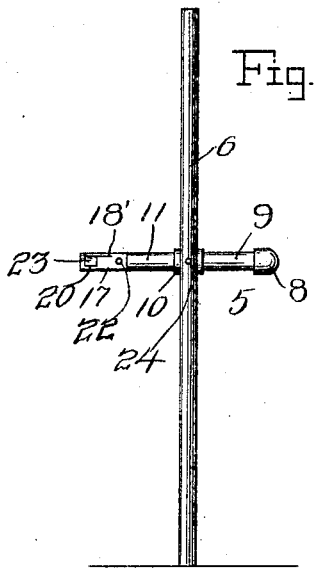
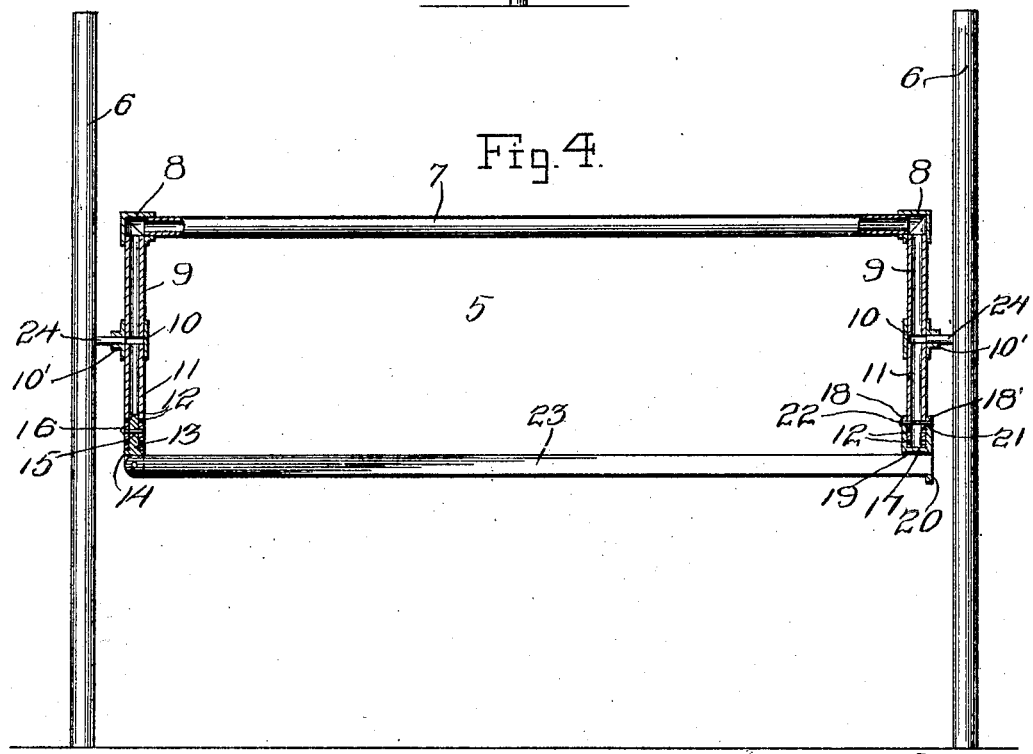
Witnesses
C. K. Reichenbach
E. M. Wolford
Inventor
P. F. Miller
By Chandlee & Chandlee
Attorneys

UNITED STATES PATENT OFFICE.

PETER F. MILLER, OF BLOOMING PRAIRIE, MINNESOTA.

STANCHION.

No. 835,911.     Specification of Letters Patent.     Patented Nov. 13, 1906.

Application filed April 4, 1905. Serial No. 253,879.

*To all whom it may concern:*

Be it known that I, PETER F. MILLER, a citizen of the United States, residing at Blooming Prairie, in the county of Steele, State of Minnesota, have invented certain new and useful Improvements in Stanchions; and I do hereby declare the following to be a full, clear, and exact description of the invention, such as will enable others skilled in the art to which it appertains to make and use the same.

This invention relates to stanchions for confining cows or other stock, and has for its object to provide a stanchion which will be pivoted in such a way that the animals will be permitted considerable range of movement in order that they may stand or lie down while confined.

Another object is to provide a stanchion which will be adjustable to suit different conditions and which will be so constructed that it may be manufactured at an extremely low figure.

Other objects and advantages will be apparent from the following descriptions, and will be understood that modifications of the specific construction shown may be made and any suitable materials may be used without departing from the spirit of the invention.

Figure 1:
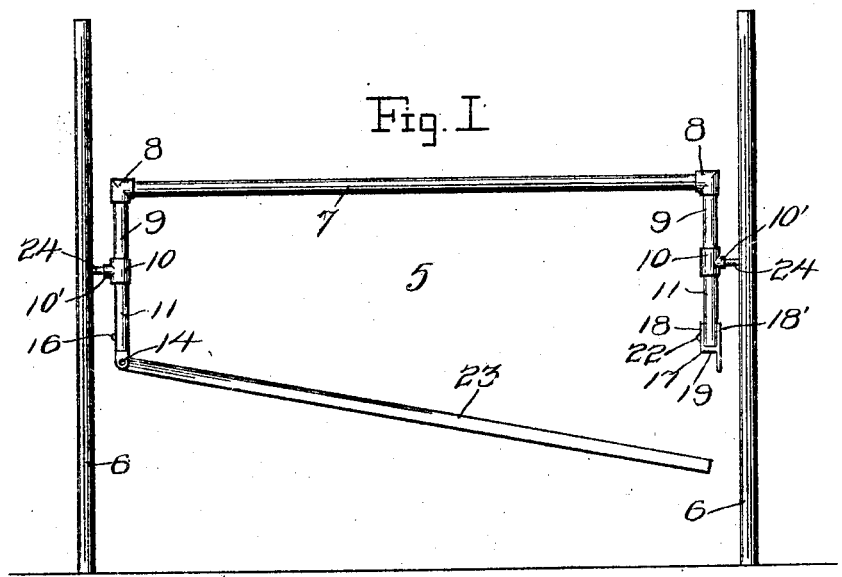
Figure 2:
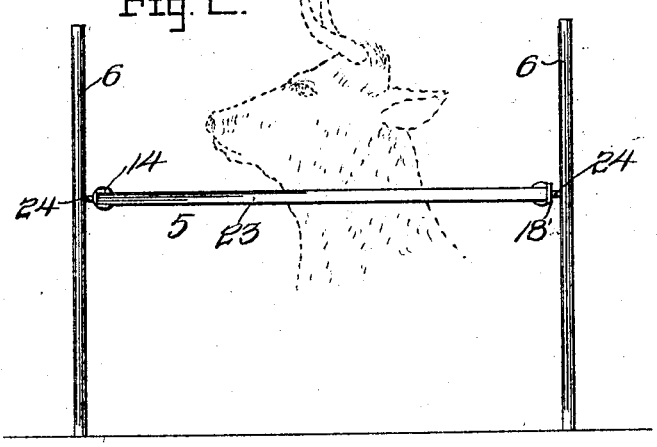

In the drawings forming a portion of this specification and in which like numerals of reference indicate similar parts in the several views, Figure 1 is a front elevation of the present invention. Fig. 2 is a view showing a cow with its neck confined in the stanchion, the cow being illustrated as lying down to show the position of the stanchion under such circumstances. Fig. 3 is an end view. Fig. 4 is an elevation, partly in section.

Referring now to the drawings, the present invention comprises a yoke 5 and supporting-uprights 6. The yoke comprises a horizontal member 7, formed of a section of gas-pipe, having L's 8 screwed upon its ends and turned in the same direction. Short pipe-sections 9 are engaged in the L's at one end and have T's 10 engaged at the other end. Other pipe-sections 11 are also engaged in the T's and aline with the pipe-sections 9, and, as shown, the stems 10' of the T's are directed outwardly, for a purpose to be presently described.

Each of the pipe-sections 11 is provided with a plurality of vertically-spaced alining pairs of perforations 12, and slidably engaged in one of these pipe-sections there is the stem 13 of a yoke 14, the stem having a perforation 15 therein arranged for alinement with the pairs of perforations 12 interchangeably for the reception of a confining-pin 16, and it will thus be seen that the yoke 14 is adjustable vertically.

A latch 17 is carried by the other pipe-section 11, and consists of spaced arms 18 and 18', which are connected by a horizontal member 19. The arm 18' extends below this member 19 and is provided with an opening 20, the arm being formed of resilient material and being arranged for movement of its downwardly-extending portion toward and away from the yoke 14 and lying normally at the limit of its movement in the direction of the yoke. The arms 18 and 18' are provided with alining perforations 21, which are arranged for interchangeable registration with the perforations 12 of the pipe-section 11, which carries the latch for the reception of the confining-pin 22, the latch being thus adjustable vertically.

A movable member 23 is pivoted at one end between the arms of the yoke 14 and is movable to bring its free end into and out of engagement with the perforation 20 of the arm 18', the member 23, when in engagement with the perforation 20, lying parallel to the member 7.

The supporting-uprights 6 have inwardly-extending alining pivot-pins 24 secured thereto, and these pivot-pins are engaged in the stems of the T's 10 for pivotal movement of the yoke 5 thereupon. The member 23 is somewhat heavier than the member 7, so that it holds the yoke normally with the pipe-sections 9 and 11 thereof extending vertically, and it will be readily understood that when an animal is to be confined in the stanchion its neck is engaged in the yoke between the members 7 and 23, the adjustability of the yoke 14 and the latch 17 making it possible to vary the distance between the two members to suit different conditions.

What is claimed is—

In a cattle-stanchion, the combination with spaced uprights, of a yoke pivoted between the uprights, said yoke including end members and a horizontal member connected to one end of each of the end members, one of said end members having a socket therein at the opposite end from the horizontal member, a stem slidably engaged in the socket and having a transverse opening therein, said end member having transverse openings communicating with its socket for interchangeable registration with the opening of the stem, a pin engaged in the opening of the stem and a pair of the openings of the end member, a movable member pivotally connected with the stem for movement into and out of parallel relation to the horizontal member, a latch having spaced arms engaged at opposite sides of the other end member and having alining openings therein, said end member having a longitudinal series of transverse openings arranged for interchangeable registration with those of the arms, a pin removably engaged in the openings of the arm and in an opening of the second-named end member, said latch being arranged to receive the movable member and to hold the latter in parallel relation to the horizontal member.

In testimony whereof I affix my signature in presence of two witnesses.

PETER F. MILLER.

Witnesses:
T. A. HELVIG,
A. SOLBERG.